Figure 1:
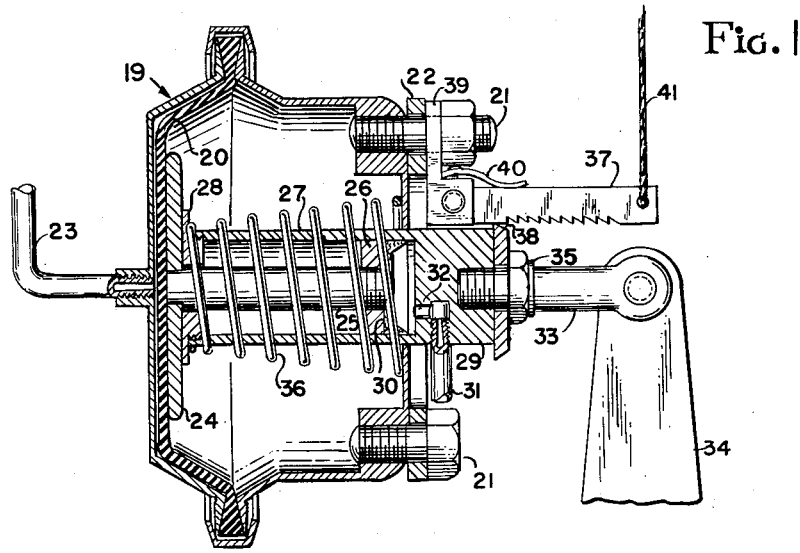

Nov. 6, 1962  R. S. BRIMHALL  3,062,591
COMBINATION OF A NORMAL AND AUXILIARY BRAKING SYSTEM
Filed Jan. 11, 1957

INVENTOR.
RAY S. BRIMHALL
BY
*Andrew & Seeales*
Attorneys

United States Patent Office 3,062,591
Patented Nov. 6, 1962

3,062,591
COMBINATION OF A NORMAL AND AUXILIARY BRAKING SYSTEM
Ray S. Brimhall, 758 W. 14th N., Salt Lake City, Utah
Filed Jan. 11, 1957, Ser. No. 633,752
2 Claims. (Cl. 303—6)

This invention relates to braking systems for large trucks and tractors and particularly has reference to a braking construction for normal and emergency or auxiliary operation.

The braking construction of the invention, in general, comprises an air chamber within which is disposed a diaphragm and a spring. The diaphragm engages a pressure plate on the end of a piston rod to move the rod in one direction when air is applied to the diaphragm within the air chamber. The cylinder in which the piston operates has its inner end normally bearing against the pressure plate and provided with a circumferential flange constituting a seat for the spring, and has its outer end head connected directly to the brake actuating arm to transmit brake actuating forces when the diaphragm moves the piston and cylinder outwardly of the chamber. The spring engages the flange on the cylinder opposite the diaphragm to move the cylinder and piston rod in the opposite direction to its initial position when the air pressure on the diaphragm is released.

When the diaphragm is moved outwardly by air pressure in the air chamber it forces the cylinder bodily outwardly and directly actuates the brake. The spring returns the cylinder upon discontinuance of the air pressure behind the diaphragm.

In the event the air pressure fails, the auxiliary system then takes over. This system comprises an inlet to the forward end of the cylinder for hydraulic fluid. When fluid is supplied to the cylinder, the outer cylinder head is separated from the piston with the result that the cylinder actuates the brake arm without actuation of the diaphragm. When the hydraulic pressure is discontinued the spring returns the cylinder to normal position where the inner head engages the pressure plate on the diaphragm, and effects draining of the cylinder.

Means are also provided to lock the braking mechanism in the braking position.

The drawings furnished herewith illustrate the best mode of carrying out the invention as presently contemplated and set forth hereinafter.

Figure 2:
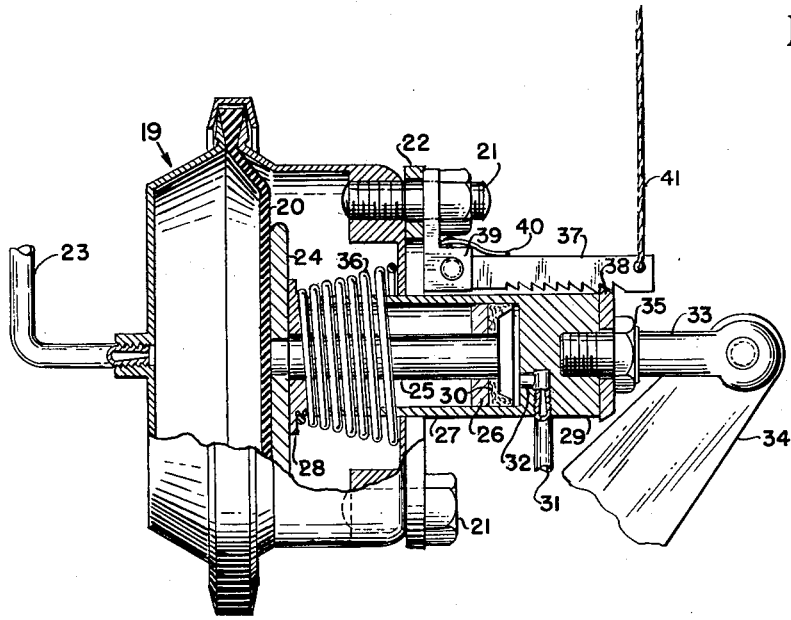

In the drawings:

FIG. 1 is a longitudinal sectional view of an embodiment of the invention with a brake locking mechanism; and FIG. 2 is a view similar to FIG. 1 showing operation of the braking mechanism by air pressure moving the diaphragm outwardly.

Referring to the drawings, there is shown an air chamber 19 within which is clamped the diaphragm 20. The chamber 19 is provided with bolts 21 which extend into embossments on one wall of chamber 19 to secure the unit to the bracket 22 of a truck or other vehicle.

Air is supplied to chamber 19 through inlet pipe 23 to expand diaphragm 20. Diaphragm 20 engages flat pressure plate 24 which is suitably secured to a piston rod 25. Piston rod 25 carries a head 26 which operates within the hydraulic cylinder 27, the greater portion of which normally in non-braking condition is located inside of chamber 19.

Cylinder 27 is closed by inner head 28 and outer head 29. The outer head 29 is always located outside of chamber 19, and inner head 28 engages plate 24 when the unit is in non-braking and also in regular braking position. The piston head 26 carries a sealing material 30 to seal the head for operation within cylinder 27.

Hydraulic fluid may be supplied to the chamber between piston head 26 and outer head 29 through an inlet pipe 31 and passage 32 in head 29 from a suitable source of fluid, not shown. If the air pressure fails, the hydraulic fluid is employed to actuate cylinder 27. A clevis 33 is threaded into cylinder head 29 and is pivoted to the brake arm 34 for slack adjustment of the clevis within 33 provides for slack adjustment of the clevis within head 29.

In both the case of actuation of cylinder 27 by air pressure and by hydraulic pressure, the cylinder 27 is returned to the non-braking position illustrated in FIG. 1 by a coil spring 36 which engages the inner head 28 and seats on a wall of chamber 19.

FIG. 2 illustrates the position of the parts when air pressure has been supplied to chamber 19 to move the diaphragm outwardly. During this actuation of the brake by air pressure behind the diaphragm, the piston 26 remains in normal position within cylinder 27. The spring 36 serves to return the cylinder 27, piston 26, pressure plate 24 and diaphragm 20 as a unit to the position of FIG. 1 upon release of the air pressure behind the diaphragm.

Should the air pressure fail for any reason an emergency actuation of the brake is obtained by forcing hydraulic pressure through pipe 31 and against the piston 26 to extend the cylinder therefrom with the piston 26 and pressure plate 24 remaining in the position shown in FIG. 1.

The spring 36 serves to return the cylinder 27 to normal non-extended position and to drain the cylinder through pipe 31 upon release of the hydraulic pressure.

In order to hold the brakes in locked position, there is provided a serrated ratchet arm 37, which extends along the outer head 29 of hydraulic cylinder 27. The outer end of head 29 has a flange or ratchet lip 38 which is shaped to fit within the serrations on arm 37.

The inner end of arm 37 is pivoted to a link 39 of generally L-shape which is secured to chamber 19 by one of the bolts 21. A leaf spring 40 is secured to link 39 and engages the top of arm 37 to normally bias arm 37 toward cylinder 27. Thus when cylinder 27 is moved outwardly, spring 40 biases the serrations of arm 37 into engagement with flange 38 on head 29. The serrations ride over the flange as the cylinder moves outwardly, but when movement of the cylinder stops, a tooth or serration on arm 37 engages flange 38 and prevents return of cylinder 27 under the force of coil spring 36.

In order to release the cylinder 27, arm 37 is engaged at the outer end by a cable 41 whereby the operator may lift the arm from cylinder 27 and free the cylinder from the serrations on the arm for movement to non-braking position.

The invention provides a compact unit for operating brakes under normal and emergency conditions along with means to lock the brakes in braking position if the same is desired.

Various modes of carrying out the invention are contemplated as being within the scope of the following claims particularly pointing out and distinctly claiming the subject matter which is regarded as the invention.

I claim:

1. In a normal and auxiliary brake applying system for actuating the brake arm of a vehicle, a chamber, a diaphragm secured in said chamber, said chamber having a pressure fluid inlet opening to one side of said diaphragm, a main source of pressure fluid connected to said inlet to actuate said diaphragm in an outward direction, a cylinder disposed on the side of said diaphragm opposite said inlet and partially within said chamber generally axially thereof, means connecting the outer end of said cylinder to the brake arm to actuate the latter, a head at the inner end of said cylinder normally seated against the last mentioned side of said diaphragm, a piston within said cylinder and having a piston rod extending through said inner head of the cylinder and secured to said diaphragm, a source of auxiliary fluid pressure, means to supply auxiliary fluid pressure from said source into the outer end of said cylinder to move the latter outwardly and thereby actuate said brake arm when said diaphragm is not actuated, and spring means within said chamber between an abutment at the inner end of said cylinder and an inner wall of said chamber to bias the cylinder at all times toward said normal seated position against said diaphragm and to thereby bias said diaphragm toward non-braking position, said spring means serving to return the brake arm to non-braking position both following actuation by said diaphragm and by said piston.

2. The construction of claim 1 and pivotal ratchet means disposed to interlock said cylinder and chamber in brake actuating position of the cylinder until released by an operator.

References Cited in the file of this patent

UNITED STATES PATENTS

| | | |
|---|---|---|
| 1,213,363 | Henry | Jan. 23, 1917 |
| 1,925,864 | Delay | Sept. 5, 1933 |
| 2,127,890 | Sills et al. | Aug. 23, 1938 |
| 2,130,892 | Morphet | Sept. 20, 1938 |
| 2,235,238 | Saunders | Mar. 18, 1941 |
| 2,626,021 | McAlpine | Jan. 20, 1953 |
| 2,645,313 | Schaadt | July 14, 1953 |
| 2,649,169 | Holman | Aug. 18, 1953 |
| 2,726,738 | Fawick | Dec. 13, 1955 |
| 2,759,569 | Keehn | Aug. 21, 1956 |
| 2,860,736 | Belsky | Nov. 18, 1958 |
| 2,871,827 | Euga | Feb. 3, 1959 |
| 2,873,579 | Safford | Feb. 17, 1959 |
| 2,903,848 | Mayhew et al. | Sept. 15, 1959 |
| 2,907,415 | Norman | Oct. 6, 1959 |
| 2,934,380 | Julier et al. | Apr. 26, 1960 |
| 2,937,622 | Brimhall | May 24, 1960 |

UNITED STATES PATENT OFFICE
CERTIFICATE OF CORRECTION

Patent No. 3,062,591                 November 6, 196

Ray S. Brimhall

It is hereby certified that error appears in the above numbered patent requiring correction and that the said Letters Patent should read as corrected below.

Column 2, line 7, for "slack adjustment of the clevis within" read -- to actuate the same. A collar 35 on the clevis --.

Signed and sealed this 23rd day of April 1963.

(SEAL)
Attest:

ERNEST W. SWIDER
Attesting Officer

DAVID L. LADD
Commissioner of Patents